US012625488B2

(12) United States Patent
Borrison et al.

(10) Patent No.: US 12,625,488 B2
(45) Date of Patent: May 12, 2026

(54) DATA EXTRACTION IN INDUSTRIAL AUTOMATION SYSTEMS

(71) Applicant: ABB Schweiz AG, Baden (CH)

(72) Inventors: Reuben Borrison, Schwetzingen (DE); Julius Rueckert, Langen (DE); Matthias Berning, Worms (DE); Roland Braun, Niederkassel Lülsdorf (DE)

(73) Assignee: ABB Schweiz AG, Baden (CH)

( * ) Notice: Subject to any disclaimer, the term of this patent is extended or adjusted under 35 U.S.C. 154(b) by 430 days.

(21) Appl. No.: 18/296,614

(22) Filed: Apr. 6, 2023

(65) Prior Publication Data

US 2023/0244218 A1 Aug. 3, 2023

Related U.S. Application Data

(63) Continuation of application No. PCT/EP2021/077408, filed on Oct. 5, 2021.

(30) Foreign Application Priority Data

Oct. 7, 2020 (EP) .................................... 20200604

(51) Int. Cl.
*G05B 19/418* (2006.01)
*G06F 40/20* (2020.01)

(52) U.S. Cl.
CPC ... *G05B 19/41865* (2013.01); *G05B 19/4185* (2013.01); *G06F 40/20* (2020.01)

(58) Field of Classification Search
None
See application file for complete search history.

(56) References Cited

U.S. PATENT DOCUMENTS 8,464,168 B2 * 6/2013 Bump ................ G05B 23/0216
711/111
2002/0087290 A1 7/2002 Wegerich et al.
(Continued)

FOREIGN PATENT DOCUMENTS

CN 204730192 U 10/2015
CN 106534184 A 3/2017
(Continued)

OTHER PUBLICATIONS

European Patent Office, Extended European Search Report in European Patent Application No. 20200604.5, 9 pp. (Mar. 29, 2021).

(Continued)

*Primary Examiner* — Hasanul Mobin
(74) *Attorney, Agent, or Firm* — Fitch Even Tabin & Flannery LLP

(57) ABSTRACT

A system and method for providing a configuration for data extraction from an automation system includes a signal selection agent configured to: receive a user selection of at least one module of the automation system; generate, for display to the user, a user interface identifying one or more selectable signals associated with the selected module and displaying one or more guidance elements comprising data mined from data sources pertaining to the automation system for guiding the user in the selection of relevant signals; receive a user selection of one or more of the selectable signals; and automatically generate the configuration for data extraction on the basis of the selected signals.

13 Claims, 6 Drawing Sheets

(56)         References Cited

U.S. PATENT DOCUMENTS

| | | | | |
|---|---|---|---|---|
| 2003/0055529 A1* | 3/2003 | Aosawa | ............. | H04L 41/0883 |
| | | | | 700/220 |
| 2005/0240545 A1* | 10/2005 | Schachtely | ........ | G05B 23/0227 |
| | | | | 706/47 |
| 2007/0011124 A1* | 1/2007 | Behdjati | ................ | G06Q 10/00 |
| | | | | 706/45 |
| 2007/0079250 A1* | 4/2007 | Bump | ................ | G05B 23/0216 |
| | | | | 398/112 |
| 2008/0077268 A1* | 3/2008 | Retlich | ............. | G06Q 30/0633 |
| | | | | 700/117 |
| 2008/0313594 A1* | 12/2008 | Smith | ....................... | G06F 8/20 |
| | | | | 717/100 |
| 2009/0083732 A1* | 3/2009 | Shen | ......................... | G06F 8/20 |
| | | | | 717/177 |
| 2009/0088870 A1* | 4/2009 | Baier | .............. | G05B 19/41865 |
| | | | | 700/28 |
| 2009/0135675 A1* | 5/2009 | Akiyama | ............... | G04R 20/06 |
| | | | | 368/21 |
| 2009/0300524 A1* | 12/2009 | Carlson | ................... | G06F 9/451 |
| | | | | 715/763 |
| 2011/0167335 A1* | 7/2011 | Nickas, Jr. | ................ | G06F 8/20 |
| | | | | 715/235 |
| 2015/0186483 A1* | 7/2015 | Tappan | ............. | G05B 19/4063 |
| | | | | 707/737 |
| 2016/0065656 A1* | 3/2016 | Patin | ....................... | H04L 67/10 |
| | | | | 709/201 |
| 2017/0236520 A1* | 8/2017 | Borgstrom | ............. | G10L 17/12 |
| | | | | 704/239 |
| 2018/0024537 A1* | 1/2018 | Chauvet | ............. | H04L 12/4641 |
| | | | | 718/104 |
| 2018/0107178 A1* | 4/2018 | Nixon | ................... | G06F 16/248 |
| 2018/0248980 A1 | 8/2018 | Götz et al. | | |
| 2018/0322396 A1 | 11/2018 | Ahuja-Cogny et al. | | |
| 2019/0028370 A1* | 1/2019 | Church | ................. | G06F 16/955 |
| 2019/0370610 A1* | 12/2019 | Batoukov | ........... | G06F 11/0709 |
| 2019/0384640 A1* | 12/2019 | Swamy | ................. | G06F 9/5038 |
| 2020/0089216 A1* | 3/2020 | Cella | ................. | G05B 19/0425 |
| 2020/0341779 A1* | 10/2020 | Rohde | ........................ | G06F 8/20 |
| 2022/0058571 A1* | 2/2022 | Edwards | ............. | G06Q 10/087 |

FOREIGN PATENT DOCUMENTS

| | | | | | |
|---|---|---|---|---|---|
| CN | 106550052 | A | | 3/2017 | |
| CN | 107272628 | A | | 10/2017 | |
| CN | 206891989 | U | | 1/2018 | |
| CN | 107957718 | A | | 4/2018 | |
| CN | 110610240 | A | | 12/2019 | |
| CN | 113261009 | A | * | 8/2021 | ............ G06V 10/82 |
| GB | 2556445 | A | | 5/2018 | |
| JP | 2990403 | B2 | | 12/1999 | |
| WO | WO 2011/150715 | A1 | | 12/2011 | |
| WO | WO 2019/094891 | A1 | | 5/2019 | |

OTHER PUBLICATIONS

European Patent Office, International Search Report in International Patent Application No. PCT/EP2021/077408, 3 pp. (Jan. 18, 2022).
European Patent Office, Written Opinion in International Patent Application No. PCT/EP2021/077408, 6 pp. (Jan. 18, 2022).
Canadian Intellectual Property Office, Office Action in Canadian Patent Application No. 3,194,059, 4 pp. (Aug. 21, 2024).

* cited by examiner

DATA EXTRACTION IN INDUSTRIAL AUTOMATION SYSTEMS

CROSS-REFERENCE TO RELATED APPLICATIONS

This patent application claims priority to International Patent Application No. PCT/EP2021/077408, filed on Oct. 5, 2021, and to European Patent Application No. 20200604.5, filed on Oct. 7, 2020, each of which is incorporated herein in its entirety by reference.

FIELD OF THE DISCLOSURE

The present disclosure relates to data extraction in industrial automation systems.

BACKGROUND OF THE INVENTION

Referring to FIG. 1, non-automation experts (e.g., data scientists) are commonly faced with the task of extracting control system data from a distributed control system (DCS) 100 providing plant automation. Although the data scientist is likely to have limited knowledge of the system 100, extracting the data is a mandatory step in enabling the data scientist to process the data using available software tools.

To this end, the system 100 may provide a standardized interface 102 (e.g., OPC UA) which exposes data in the form of a browsable address space.

However, manually identifying the relevant signals to export by browsing the address space is challenging, time-consuming or even infeasible for the data scientist due to the large size of the address space and the requisite knowledge of the system 100. Automation experts familiar with the details of the system may not always be available. Exporting all accessible data is infeasible due to the high load placed on the DCS, with most data being irrelevant for the analysis.

BRIEF SUMMARY OF THE INVENTION

There is therefore a need to facilitate data extraction in industrial automation systems with minimal involvement of the automation expert. The claimed subject-matter may provide for mapping of domain concepts and knowledge as well as documentation to signals, thus enabling signal identification based on engineering data, and supporting the data scientist in configuring data extraction from the DCS without the need to understand engineering details of the DCS. The claimed subject-matter may drastically reduce the time required to configure the data extraction and/or render the data extraction feasible in the first place. The claimed subject-matter may therefore represent an important enabler for easy "plug-and-play" configuration and provisioning of data collection mechanisms.

The claimed guidance elements assist the user in performing a technical task in the form of searching for and retrieving relevant signals within the large address space exposed by the interface of the automation system by means of a guided human-machine interaction process.

By "non-automation expert" is meant herein a person who is not an automation expert or process expert. The non-automation expert may also be referred to as an automation non-expert, a layperson in the field of automation, or simply as a user or operator. The term refers in particular to data scientists.

The term "domain concept" refers to a generic automation entity such as a pump, sensor, field instrument, meter e.g., flow meter, motor, drive, controller, communications interface, operator workstation, or server. The entity may be a module or module type, in the case of a modular plant, or any other device, component or plant equipment forming part of an industrial automation system. The domain concept is generic in that it is not tied to any particular instance of the corresponding entity. A domain concept may thus be viewed as data providing one or more of a classification of an entity, its functions, typical use, and relation to other entities. By "domain" is meant herein the domain of industrial automation systems. The term "domain concept" may be replaced herein by "entity concept". The term "domain knowledge" may thus be understood as a collection of domain concepts.

By "properties" is meant functional and non-functional features/characteristics of a domain concept. A pump, for example, has a number of static features, such as a maximum load it can handle, its electric specification regarding power consumption, etc. In addition, it also has dynamic or operational features, such as the current speed of the pump, its temperature, etc. Some of the features provide information on the operational state of the equipment (e.g., running/off), whereas some might be relevant to triggering an action (e.g. turning the equipment on/off. Some features/characteristics may be mapped to read-only signals and others to read/write signals. The static features/characteristics may furthermore include information mined from external artifacts (as described further below). This could be information regarding the use of the equipment, links to documentation, etc.

In the context of the present disclosure, the terms "module", "device", and "equipment" may be used interchangeably. The terms "signal" and "variable" may also be used interchangeably.

In a further aspect, there is provided a documentation importer configured to mine data from one or more data sources pertaining to an automation system and to construct a knowledge graph comprising the data mined from the data sources. A corresponding method is also provided.

Further aspects and examples of the invention will become apparent from and be elucidated with reference to the embodiments described hereinafter.

BRIEF DESCRIPTION OF THE SEVERAL VIEWS OF THE DRAWING(S)

DETAILED DESCRIPTION OF THE INVENTION

Figure 1:
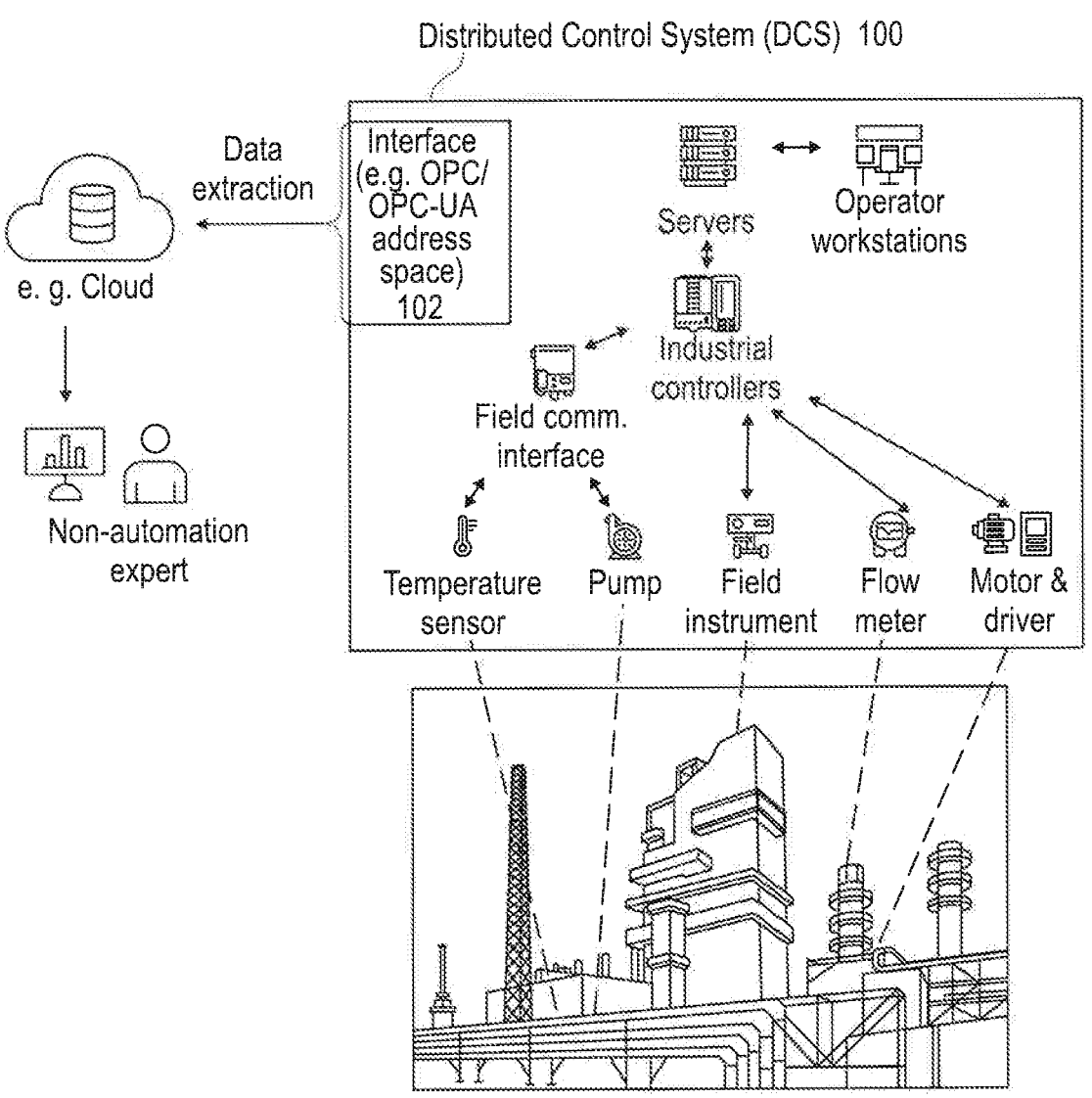
FIG. 1 illustrates data extraction by a non-automation expert from a distributed control system.
Figure 2:
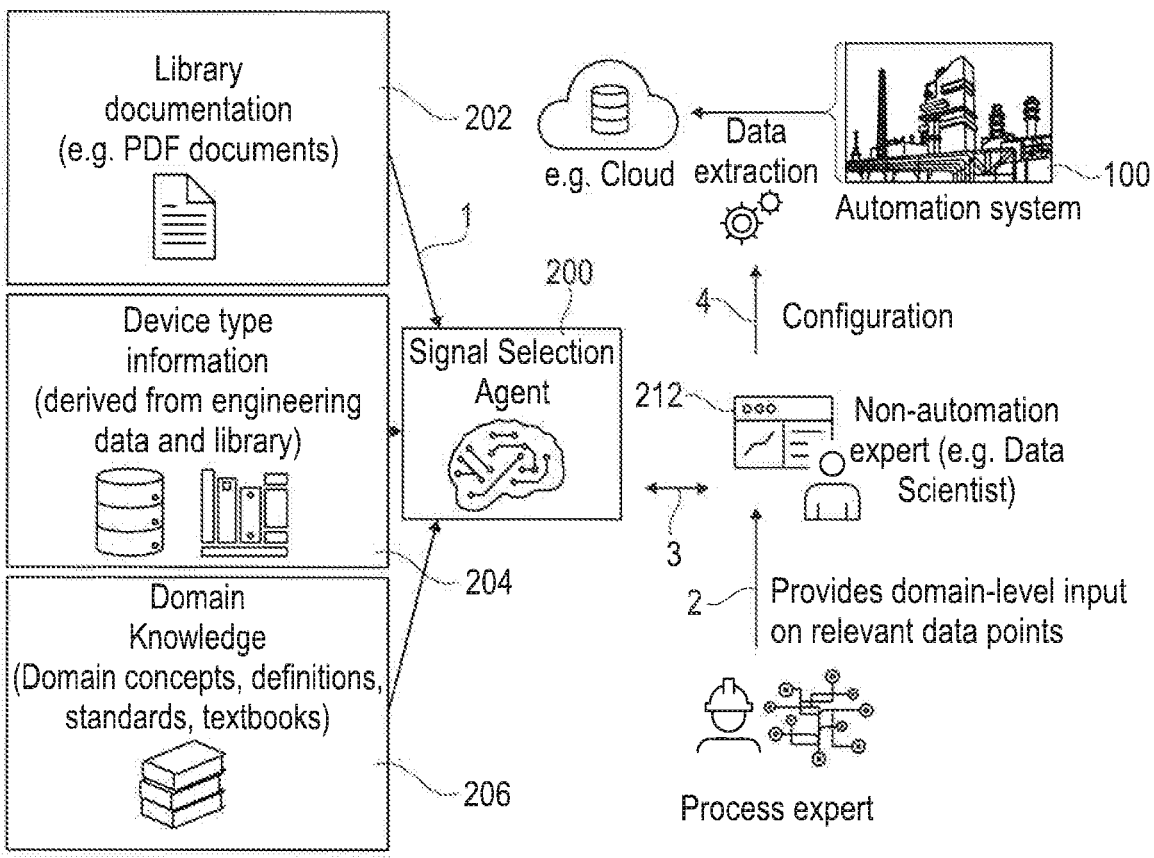
FIG. 2 illustrates a signal selection agent for facilitating the data extraction as shown in FIG. 1.
Figure 3:
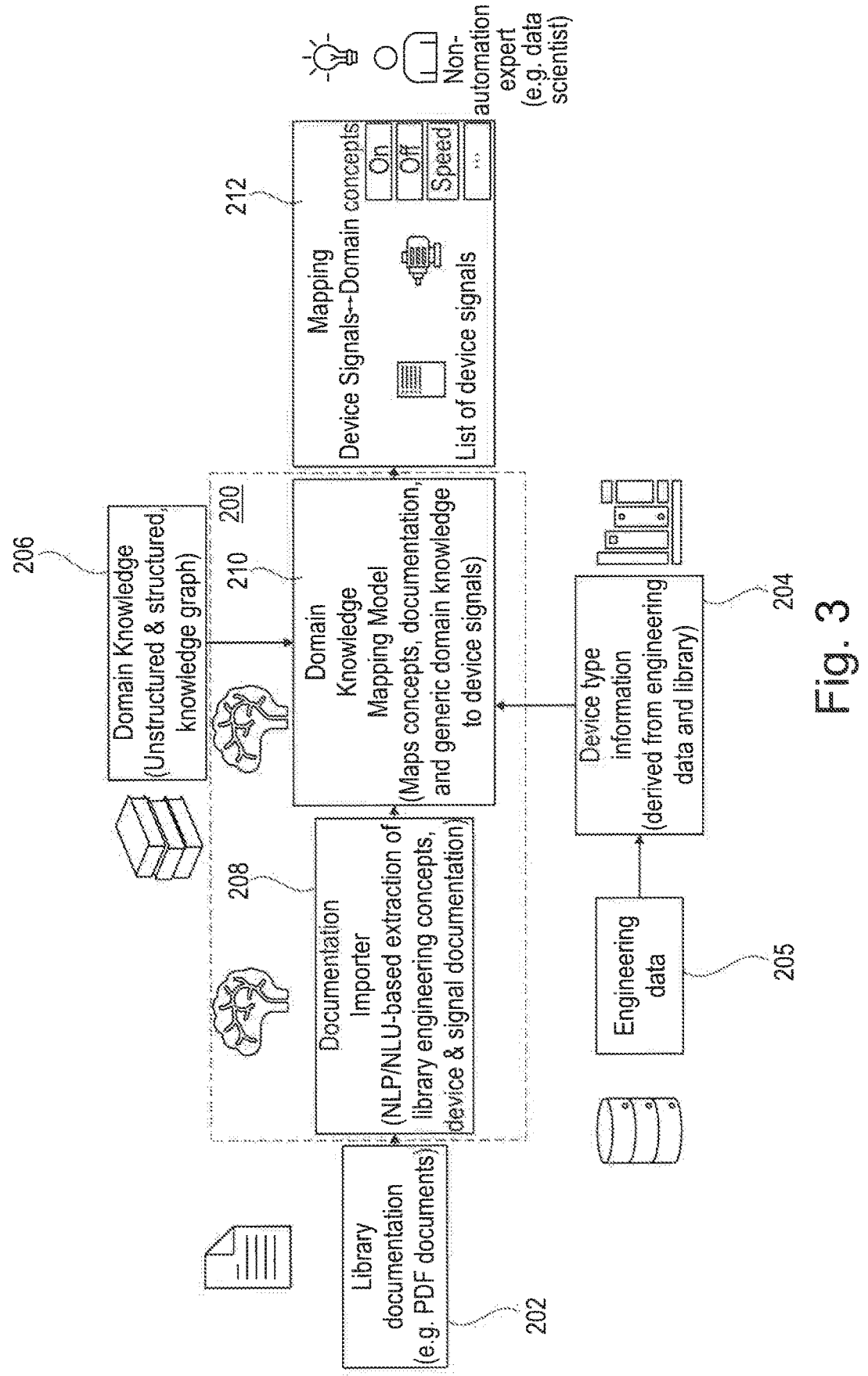
FIG. 3 illustrate the signal selection agent of FIG. 2 in more detail.

FIGS. 2 and 3 illustrate a signal selection agent 200 for facilitating configuration of the data extraction as discussed above with reference to FIG. 1. The signal selection agent 200, which may also be described as a signal explainer agent or a signal recommendation agent, supports signal identification using a domain knowledge mapping model 210 and using an intuitive user interface 212 for signal identification and selection.

FIG. 2 illustrates steps 1-4 of a method of providing a configuration for data extraction from the distributed control system 100 (which may also be referred to as an automation system 100). The steps may be performed by or using the signal selection agent 200. The steps briefly comprise step 1—training the domain knowledge mapping model 210; step 2—receiving the selection of at least one module of the system 100 for analysis; step 3—selecting relevant signals using a model-provided mapping 222 between signals of the selected module and domain concepts; and step 4—generating the configuration for data extraction on the basis of the selected signals.

In more detail, step 1 comprises the build-up and training of the domain knowledge mapping model 210—which may comprise a machine learning model—to map domain knowledge provided by one or more data sources (including for example one or more engineering library documentation 202, engineering data 205, from which module type information 204 is derived), and domain knowledge 206) to the selectable signals of a module of an automation system. In particular, training of the model 210 may use a knowledge graph that represents domain concepts mined from the data sources 202-206. The model 210 may be trained to map signals of a given module to the domain concepts described in the knowledge graph. This training can be undertaken in a supervised or unsupervised manner, depending on the quality of the data. Training of the model 210 may be undertaken during an offline training phase. For the training of the model 210, library documentation for exemplary engineering libraries and/or the library source code and/or documentation may be used and annotated by engineering experts or trained users.

In this respect, domain concepts are mapped to concrete library module types. Additionally, the signals defined for the type are mapped to properties defined for the domain concept. In this way, generic descriptions of properties from the domain concepts are mapped to concrete descriptions of signals in the mapping 222 described below. The features used for the mapping comprise one or more of the module type names, their signal/variable names, and features extracted from the text description. If, for example, domain concepts such as "pump" are (repeatedly) mentioned in the description of a type, this is a good indication that the description might be describing a type that fits the domain concept "pump". The targets for the mapping comprise the domain concepts from the knowledge graph. In a second step, the properties of the domain concept are mapped to concrete signals of the type. Here, also the description/documentation of signals extracted from library documentation and/or the source code documentation are used as features. Topic modeling can be applied to take input from domain documentation for training and to cluster different words for specific topics, which assists in obtaining the specific topics for the knowledge graph from code documentation. Referring again to the example of the domain concept "pump", if this is mentioned together with other domain concepts such as flow or speed, then the ML model 210 can map it to a flow sensor, for example.

The knowledge graph may be pre-provided by a third party or may be built up by the signal selection agent 200. To this end, the signal selection agent 200 optionally comprises a documentation importer 208 configured to mine data from the data sources 202-206. Individual sources of information (e.g. documents, diagrams, source code files) contained in the data sources 202-206 may be referred to as artifacts. The documentation importer 208 is configured to import and process the artifacts. The documentation importer 208 may be configured to use natural language processing (NLP) and/or natural language understanding (NLU) techniques to import and process the artifacts. Using NLP and NLU methods, these artifacts are mined by the documentation importer 208 for relevant text to describe and explain modules of the automation system. In one example, part-of-speech tagging may be used to extract relevant nouns in the role of subjects and objects from a text. Open information extraction mechanism can be used to furthermore extract propositions from a text to summarize statements about relevant entities and concepts. It will be understood that other NLP/NLU mechanisms that can derive summaries or statements on module types described in documentation artifacts may be used. Topic modeling can also handle phrases and cluster the documents, for example in an unsupervised manner, or semi-supervised with a human in the loop (for example, the process expert could help to provide labels to clusters).

The documentation importer 208 is configured to construct the knowledge graph from the mined data. The knowledge graph described herein is a graph-structured data model that represents or encodes general domain concepts and is therefore independent of specific systems. Stated differently, it is a specialization of a generic knowledge graph in that it describes domain concepts (regarding physical entities, such as pumps, motors, valves, sensors, etc.) optionally in combination with properties of those entities (such as status information or measured values). Both the domain concepts and the properties may form nodes in the knowledge graph such that the domain concept (entity) nodes are connected to the property nodes. In addition, additional information on any node can be itself encoded as a node and connected to other nodes. For example, potential actions that can be taken with regard to an entity (e.g. turning it on/off) may be described as nodes in the knowledge graph. The graph is constructed either manually by a human and/or using supervised/unsupervised automatic mechanisms that add details to the knowledge graph. In this regard, domain concepts may be derived by analyzing statements on identified entities from texts and relations between entities may be established. Generating the knowledge graph from the mined data may be semi supervised by a human (domain expert), who provides different relations and verifies the classification and ontologies generated by modeled topics.

The engineering library documentation 202 may comprise artifacts documenting the engineering of the automation system 100 as well as the individual engineering library used in the system 100. The engineering library documentation 202 may comprise files (e.g. pdf files) describing the implementation of the system 100 (structured data types, priority commands, interlock concepts, etc. and/or detailed descriptions of module types and their signals). The engineering library documentation 202 may be processed by the documentation importer 208 to extract knowledge which can be related to the general domain concepts. For example, the documentation importer 208 may be configured to extract library-specific engineering concepts, for example naming conventions, that can assist in the mapping of domain concepts to signals.

The engineering data 205 may comprise artifacts (engineering artifacts) relating to automation of the specific system 100, such as source code and configuration files. These artifacts go beyond the address space exposed by the system 100 and may include for example control code, module type information concerning modules found in the system 100 and their corresponding signals, in the context of an engineering library or engineering data of the specific system 100. The engineering data 205 may include documentation also available in the engineering library documentation 202. Examples of artifacts found in the engineering data 205 include operator screens, the graphic elements of modules, and faceplates. Artifacts in the engineering data 205 may provide information on (thereby allowing signal selection based on): usage (e.g. the signals read/written most often); type of variables (e.g. all coldretain variables); element type (e.g. all elements with faceplate); signals with certain type (e.g. all signals with unit "° C."). The engineering data 205 may include engineering tool APIs such as existing APIs to engineering tools e.g. ABB CBopenIF to Control Builder M, allowing the selection and filtering of signals based on functional grouping in engineering, e.g.: all sensor signals of a process' heating function; signals of a selected module or application; signals assigned to input/output channels. The engineering data 205 may include operations user interfaces such as: UI artifacts for operations (process graphics); modules, elements, devices, structural information shown in process graphic represent information of control code. The engineering data 205 may include information on process topology such as topology-based process information derived e.g. from P&ID diagrams or process graphics, allowing queries on the process topology and the selection of signals based on module interconnectivity via material flow in the process. The information derived from the engineering data 205 may provide information such as the signal usage in systems engineering artefacts, the signal data type, or its role in the context of its module logic type and engineering. Software-related engineering data 205 can include the location and quantity of references to signals, information mined from source code comments, or the signal protection in case of software/hardware resets. Hardware-related engineering data 205 can comprise the connection of a signal to I/O ports (i.e. the I/O allocation). In addition, many other types of information can be comprised in the engineering data 205. In one particular example, engineering artifacts derived from one or more of (1) engineering tool APIs, (2) engineering artifacts, (3) operator user interfaces, (4) process topology are used as the engineering data 205.

The domain knowledge 206 may comprise unstructured and structured knowledge, e.g. in the form of knowledge graphs, representing general domain concepts which are independent of the specific automation system 100 and its libraries. Examples of domain knowledge 206 include classification of equipment and its functions, its typical uses and its relations to other equipment, along with details on specific processes.

Referring again to FIG. 2, step 2 comprises the selection of modules by the non-automation expert. The non-automation expert selects one or more relevant modules from the address space exposed by the system 100, optionally using domain-level input on relevant data points received from the process expert. For example, the process expert may describe relevant process data points to the non-automation expert or may collaborate with them to identify relevant data points. The description of data points may be provided at the general domain level without being directly related to specifics of the automation system 100. Thus, the input by the process expert may be a mixture of domain concepts and specific names of entities. The non-automation expert then translates this process-related information to specific signals, in the manner described below, using a graphical user interface 212 to identify the correct signals based on the expert input. It will be understood that input by the process expert is not required. For example, if the non-automation expert already knows what they are looking for, no input is required by the process expert. However, in many cases specific problems are to be solved for which the process expert can pinpoint a specific device or part of the process or describe what kind of information (e.g. the temperature of a specific tank) is relevant.

Figure 4:
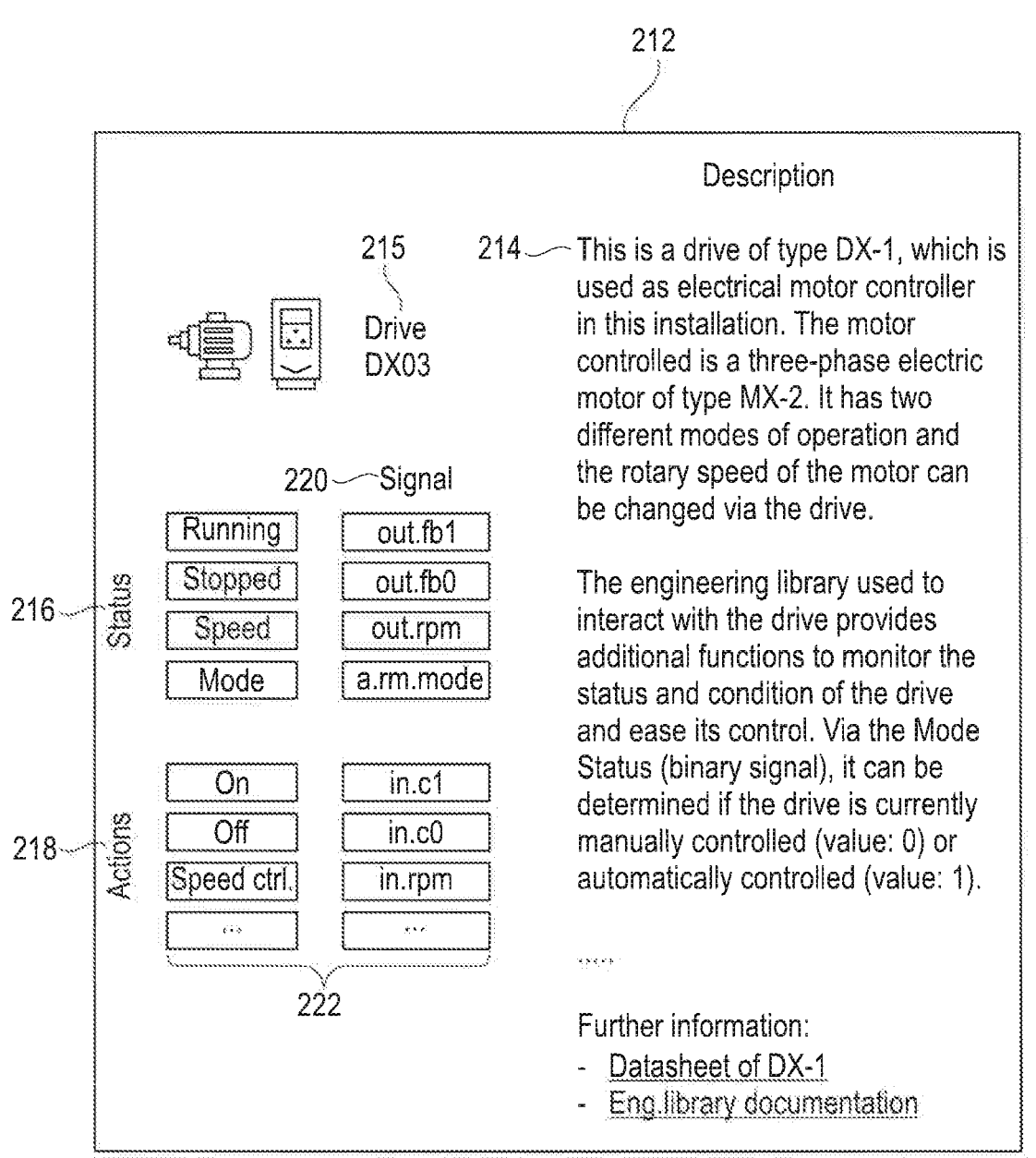
FIG. 4 illustrates an exemplary mapping produced by the signal selection agent of FIGS. 2 and 3.

Step 3 comprises signal identification and selection using the signal selection agent 200. The model 210 is used to map specific signals of the modules selected in step 2 to domain concepts. Referring to FIG. 4, the signal selection agent 200 provides a graphical user interface 212 that shows and explains the selected module at a high level. The user can browse the modules and is presented with a description 214 and/or illustration of the equipment along with its name 215 and signal labels 216, 218 for the signals 220 associated with the selected module. The elements 214-222 are derived from the domain concepts provided by the model 210. Given the mapping between concepts and signals, the concrete signals are thus displayed as part of the UI template 212, in which the properties of the domain concept are displayed with the respective mapped signals.

The description 214 may combine domain concepts from the knowledge graph with library-specific information, e.g., explaining the semantics of the signals which the module exposes, information which is not typically available to the user without engineering knowledge. In one example, the description 214 is generated based on the propositions and summaries generated via the NLP/NLU methods used in the importing step, as described above. Here, concrete signal names may be stated together with the domain concept property to highlight the mapping. Module type information and links to source documents such as datasheets may also be included in the description 214. This information may be collected by the signal selection agent for a specific module type based on the, processed input artifacts.

The intuitive signal labels 216, 218 provided by the model 210 assist the user in selecting the signals 220 to interact with the selected module. As a result of the mapping 222 between specific signals 220 from the address space and the domain-level signal labels 216, 218 provided by the model 210, the user can easily relate the signals 220 to the domain-level input optionally received from the process expert that defines the data collection requirements. This would be significantly more difficult without the output provided by the model 210 since the naming of signals typically does not reflect domain terminology. In the case that the process includes complex modules, and these are selected by the non-automation expert, the relevant signals and actions for the complex module are derived and offered for selection: this can include aggregated status information derived from multiple signals and actions that involve interactions with multiple components, including sequences of actions. Task-oriented templates may be used to load pre-selections of signals that are required for typical tasks (e.g. selecting all signals relating to basic status information for display on a process dashboard).

The signal selection agent 200 may provide further tools supporting selection of signals of interest by the data scientist to support or replace the use of the machine learning model. The user interface 212 thus provides interactive tools enabling the user to navigate and select signals based on information mined from the above-described data sources. For example, the user interface 212 is used to allow the non-automation expert to select equipment. Any of these tools may be viewed as guidance elements for guiding the user in the selection of relevant signals.

For example, the user interface 212 may further provide a graphical interaction tool (not shown) allowing graphical signal selection, the graphical interaction tool comprising one or more interactive graphical representations of parts of the system 100 configured to enable one or more of (i) the user selection of the said module of the automation system, (ii) the user selection of the one or more selectable signals. In one example, the graphical representation comprises one or more of an operator screen, a process graphic, and a process and instrumentation diagram (P&ID). In particular, operator graphics extracted from the engineering data 205 may be used to enable the graphical selection of modules and signals (e.g. selecting modules from an operator graphic by area selection and/or automatically finding modules connected to the selected module based on process topology). From the operator graphics, signals deemed relevant to show to the operator can be derived and used as starting sets for the data extraction configuration. To this end, smart P&ID diagrams and the process topology depicted in the operator graphics can be analyzed to e.g. identify all signals representing sensor readings along the main material flow.

The user interface 212 may further provide a textual interaction tool (not shown) providing search and filter capabilities (using e.g. tag names and/or other text in engineering artifacts belonging to the module or mentioned together with the module, including for example comments in source code, names of plans, components, etc.).

Additionally, the user interface 212 may further provide a template-based signal selection tool allowing selection of signals based on module type. In this regard, the agent 200 may further comprise a knowledge base including rules for typical signal selections depending on data extraction use cases. To ease the selection of signals for engineering modules of the same type, the agent 200 may use the knowledge base to provide a type-specific signal selection template. The template may define sets of signals typically of interest (e.g. sensor value, status of sensor), thereby reducing the time needed to identify relevant signals of the module (which would otherwise be hard or infeasible without knowledge of the engineering library etc.).

The graphical interaction tool, textual interaction tool and template-based signal selection tool may further facilitate configuration without engineering knowledge, particularly in cases in which the model 210 is not available.

The signal selection agent 200 may thus provide a unified user interface 212 to perform signal selection based on some or all of the above-described data sources and tools. The agent 200 may also monitor changes to the data sources and propose additional signals based on an existing configuration.

As mentioned above, the individual signals 220 selected by the non-automation expert are used in the subsequent configuration step 4.

Step 4 comprises configuring data extraction by automatic and direct configuration of the data extraction platform (which may also be referred to as a data extraction tool or data collection software) and/or by exporting a configuration file for use by the data extraction platform. User selection of module signals is translated to the data extraction configuration (which may also be referred to herein as an extraction tool configuration). The configuration uses concrete names of modules and signals to provide a path in the address space that the data extraction platform tool can use to read the specific signals. For example, this can be a path to a OPC UA variable in the address space of the OPC UA server of the system 100. An example of a path could be: Root/Control Network/A_Project/Applications/ABC_Control/Control Modules/Line: V_IO05.FB0.IOValue. The configuration may consist of many of these paths for concrete signals. The generated configuration can further include signal labels, comments on the details of the signal, annotations, tags, and so on, comprising e.g. parts of the information used in the GUI 212 described above. The configuration can specify human-readable signals names provided by the model 210 replacing the extracted system-specific names. Depending on the data extraction platform used, the configuration may take different forms. Configuration for the specific system 100 may be realized using a plug-in for the specific system 100.

It will be understood that steps 1-4 of the method may be performed in sequence by a single entity, or at separate times by separate entities. In particular, step 1, which relates to the building of the domain knowledge mapping model 210, may be undertaken at a separate time and by a separate entity to steps 2-4, which relate to the use of the model 210 in a user workflow. For example, step 1 may be performed by e.g. a provider of the signal selection agent 200, before or during delivery of the agent 200, whereas steps 2-4 may be performed at a later date by e.g. a plant operator using the agent with the prebuilt model 210.

Figure 5:
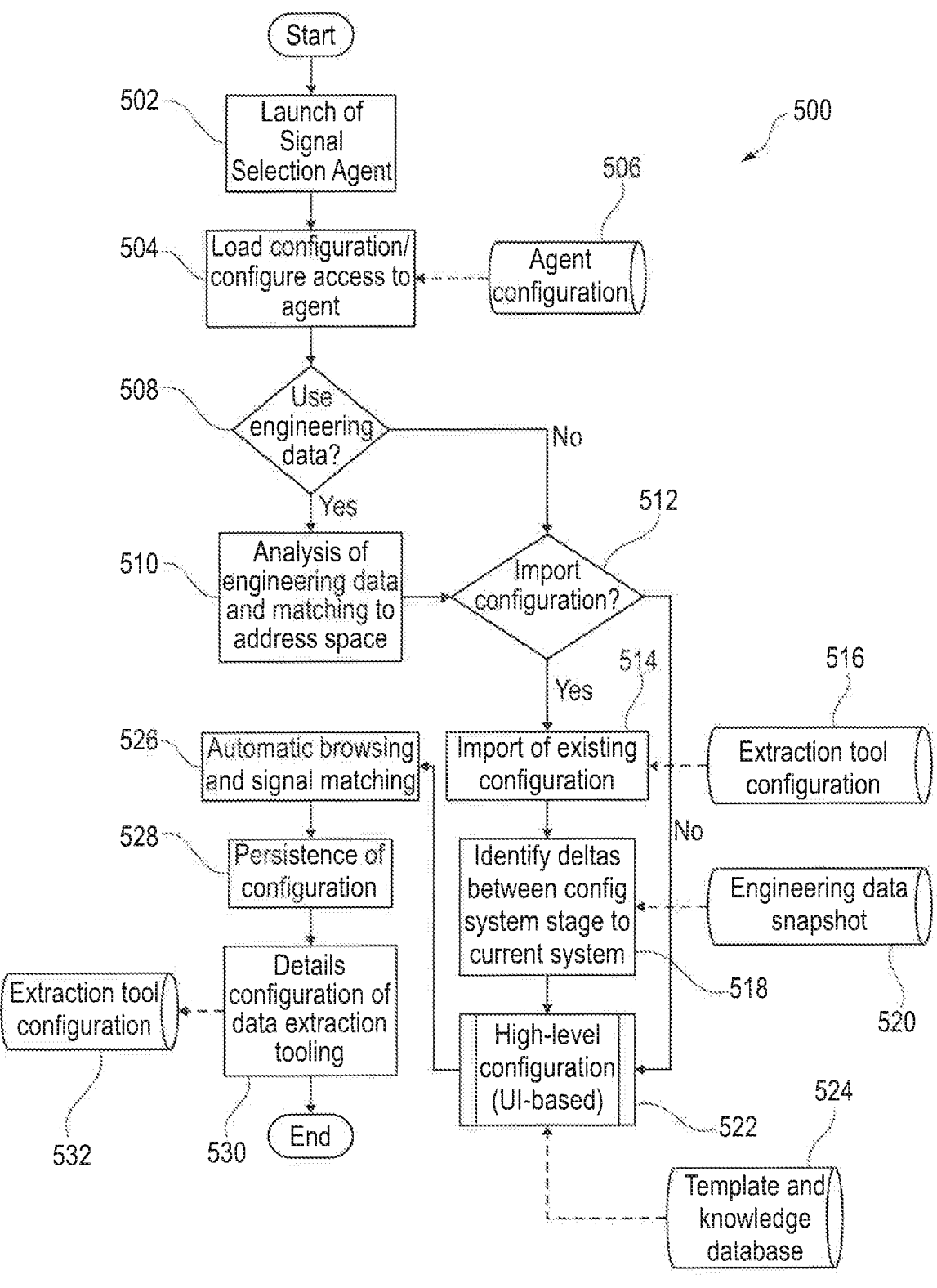
FIG. 5 illustrates a method that may be performed by the signal selection agent of FIGS. 2 and 3.

FIG. 5 illustrates a further method that may be performed by the signal selection agent 200. The method begins at 502 with the launch of the signal selection agent 200. At 504, an agent configuration 506 is loaded into the agent 200. The agent configuration 506 includes for example information on how to access the system 100 (IP address etc.) as well as credentials to access the system and address space. At 508, a query is made as to whether to use engineering data 205. In some cases, there might be no access to engineering data available. In this case, the above-described text-based search features may nonetheless be used. If yes, an analysis is performed at 510 of the engineering data 205 along with matching to the address space. The method then proceeds to step 512. If no engineering data 205 is to be used, the method proceeds directly to step 512. At step 512, a determination is made whether to import an existing extraction tool configuration 516. The existing extraction tool configuration 516 may include information on previously selected signals so that the user can reopen the configuration and change it by adding or removing new signals to be extracted. If yes, at the next step, 514, the existing extraction tool configuration 516 is imported. Otherwise, the method proceeds directly to step 522.

At 518, deltas are identified between the imported extraction tool configuration and the current system 100, possibly on the basis of engineering data snapshots 520. Deltas may occur if the engineering data 205 has changed since the last use and thus represent the difference between old and new snapshots 520 of the engineering data 205. In this case, the deltas may represent exactly that in which the user is interested because a new device was added to the system 100 and needs to be added to the data extraction. Thus, this information may be used to highlight new parts of the process. It will be understood however that the use of deltas is an optional feature. At 522, a UI-based high-level configuration is provided, perhaps with input from a template and knowledge database 524. The method then proceeds to step 526, comprising automatic browsing and signal matching. At 528 the configuration is persisted. At 530, details of the data extraction tooling are configured and an extraction tool configuration 532 is provided as output.

In one illustrative use case, a data scientist is asked to extract all relevant process values of a large chemical process. The reason for this task is to, e.g., understand anomalies in the system 100 that need to be investigated or the operator wants to save energy by analyzing the power consumption of individual components while producing a specific product. Looking into the OPC UA address space of the system, the data scientist is overwhelmed by the more than one million signals (this is a realistic number) to be found there. The structure of the address space also does not help as it is structured according to the engineering of the system, where the data scientist cannot easily find even the main components of the process without studying the address space for hours and days. Using the proposed solution, the signal selection agent 200 analyzes the engineering data 205 automatically and provides the data scientist with a graphical interface 212 to select the relevant devices and equipment of the process that are of interest based on the operator graphic or the P&ID. Some more detailed signals may be searched via a textual search using the type of the devices and their names learned from a chemical process expert. In an extended scenario, the data scientist even does not know about the specific devices and their functionality. The signal selection agent 200 helps the data scientist to understand what a device is by mapping it to (high-level) domain concepts. The agent 200 also points the data scientist to the data sheets and library documentation for more details.

Other use cases beyond data extraction using the signal selection agent 200 are also envisaged in which also the actions a module provides are of interest. Here, the selection of signals could be extended to also propose actions and sequences of actions that are used to interact with the module. A typical sequence could comprise setting a module in a specific mode (e.g. automatic/manual) before triggering the signal, e.g., for opening a valve. In the case of an abstract module, a typical sequence could comprise a startup or shutdown sequence that might involve several components of the module.

Figure 6:
FIG. 6 illustrates a computing device that can be used in accordance with the systems and methods disclosed herein.
Figure 6:
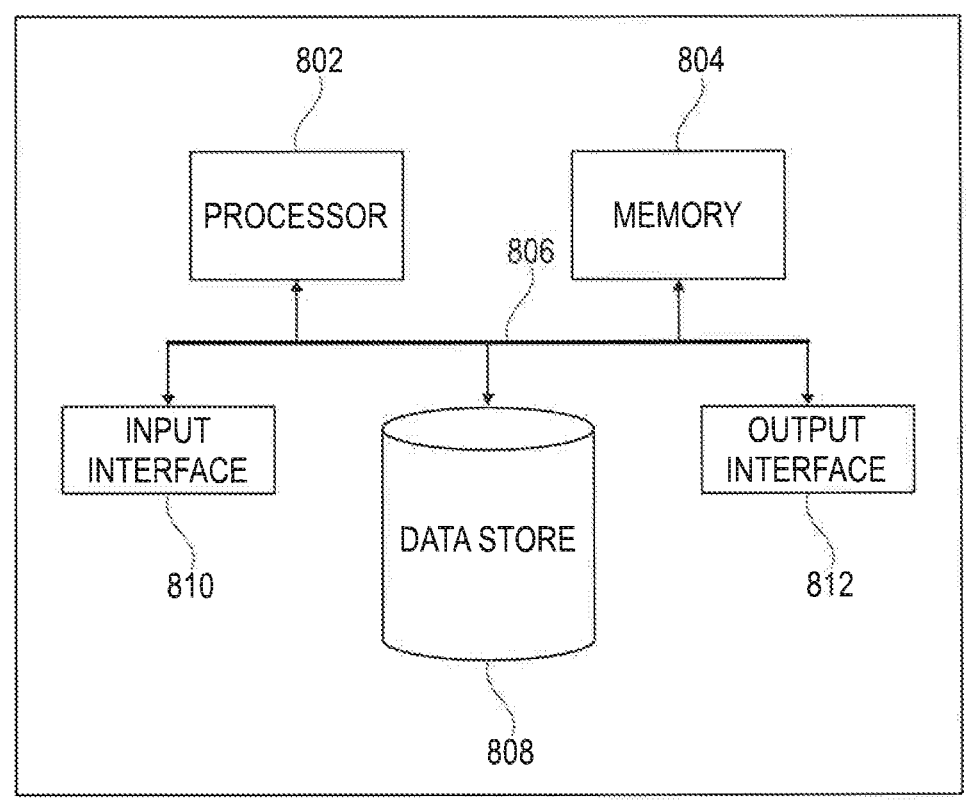

Referring now to FIG. 6, a high-level illustration of an exemplary computing device 800 that can be used in accordance with the systems and methodologies disclosed herein is illustrated. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers.

Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

While the invention has been illustrated and described in detail in the drawing and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for providing a configuration for data extraction from an automation system, the system comprising:
   at least one processor that executes instructions that are stored in a memory;
   a signal selection agent executed by at least one processor performs:
   receive a user selection of the at least one module of the automation system;
   generate, for display to the user, a user interface displaying one or more selectable signals associated with the selected module and displaying one or more tools enabling the user to select relevant signals associated with the selected module based on data mined from one or more data sources to the automation system;
   receive a user selection of one or more of the selectable relevant signals;
   automatically generate the configuration for data extraction on the basis of the selected relevant signals by translating the selected relevant signals to the configuration for data extraction, wherein the configuration uses concrete names of the at least one module and the selected relevant signals to provide a path in an address space exposed by the automation system, wherein the path is used to read the selected relevant signals associated with the selected module;
   wherein the signal selection agent comprises a domain knowledge mapping model comprising a machine learning model trained to map domain concepts based on the data mined from the one or more data sources to the selectable signals of a given module of the automation system, wherein the domain concepts provide classification data of the at least one module of the automation system.

2. The system of claim 1, wherein the domain knowledge mapping model is trained to map the selectable signals of the given module to the domain concepts described in knowledge graph comprising the data mined from the data sources.

3. The system of claim 1, wherein the signal selection agent comprises a documentation importer configured to mine the data from the data sources using one or more of (i) a natural language processing technique, (ii) a natural language understanding technique.

4. The system of claim 1, wherein the tools displayed by the user interface comprises a graphical interaction tool comprising one or more interactive graphical representations of parts of the automation system configured to enable one or more of (i) the user selection of the said module of the automation system, (ii) the user selection of the one or more selectable signals.

5. The system of claim 1, wherein the tools displayed by user interface comprises a textual interaction tool configured to provide one or more of (i) a search function, (ii) a filter function.

6. The system of claim 1, wherein the tools displayed by user interface comprises a template-based signal selection tool configured to display one or more further selectable signals associated with modules of the same type as the user-selected module.

7. The system of claim 1, wherein the tools displayed by user interface comprises a task-oriented signal selection tool configured to display one or more further selectable signals associated with a task specified by the user.

8. The system of claim 1, wherein the signal selection agent is configured to generate the user interface to display one or more further selectable signals associated with modules that are connected to the selected module in the automation system or which form part of a material flow with the user-selected module.

9. The system of claim 1, wherein the system is configured to provide to the machine learning model labeled training data specifying, as features, a plurality of signals exposed by the automation system and, as the target, labeled data mined from the data sources.

10. The system of claim 9, further configured to mine the data from the data sources optionally using one or more of (i) a natural language processing technique, (ii) a natural language understanding technique.

11. The system of claim 9, further configured to incorporate the data mined from the data sources into a knowledge graph.

12. A method of providing a configuration for data extraction from at least one module of an automation system, the method comprising:

receiving a user selection of at least one module of the automation system;

generating, for display to the user, a user interface displaying one or more selectable signals associated with the selected module and displaying one or more enabling the user to select relevant signals associated with the selected at least one module based on data mined from data sources pertaining to the automation system;

receiving a user selection of one or more of the selectable signals; and automatically generating the configuration for data extraction on the basis of the selected relevant signals by translating the selected relevant signals to the configuration for data extraction, wherein the configuration uses concrete names of the at least one module and the selected relevant signals to provide a path in an address space exposed by the automation system, wherein the path is used to read the selected relevant signals associated with the selected module;

further comprising using a domain knowledge mapping model comprising a machine learning model trained to map domain concepts based on the data mined from the one or more data sources to the selectable signals of a given module of the automation system, wherein the domain concepts provide classification data of the at least one module of the automation system.

13. The method of claim 12, further comprising training the machine learning model of the domain knowledge mapping model by providing to the machine learning model labeled training data, specifying, as features, a plurality of signals exposed by the automation system and, as the target, labeled data mined from the data sources.

* * * * *